US011001162B2

(12) United States Patent
Yamada et al.

(10) Patent No.: US 11,001,162 B2
(45) Date of Patent: May 11, 2021

(54) VEHICLE POWER SUPPLY DEVICE AND METHOD FOR CONTROLLING VEHICLE POWER SUPPLY DEVICE

(71) Applicant: TOYOTA JIDOSHA KABUSHIKI KAISHA, Toyota (JP)

(72) Inventors: Reina Yamada, Toyota (JP); Kenji Kataoka, Okazaki (JP); Hiroshi Sato, Nagoya (JP); Koji Murakami, Toyota (JP); Ken Yoshida, Nisshin (JP); Shin Okumura, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 212 days.

(21) Appl. No.: 16/406,699

(22) Filed: May 8, 2019

(65) Prior Publication Data
US 2019/0359078 A1   Nov. 28, 2019

(30) Foreign Application Priority Data

May 24, 2018   (JP) .............................. JP2018-099842

(51) Int. Cl.
*H02J 7/00* (2006.01)
*B60L 58/10* (2019.01)
(Continued)

(52) U.S. Cl.
CPC .............. *B60L 58/10* (2019.02); *B60L 50/66* (2019.02); *B60L 53/16* (2019.02); *B60L 53/20* (2019.02); *B60L 53/60* (2019.02); *H01M 10/482* (2013.01); *H02J 7/0021* (2013.01); *B60K 6/28* (2013.01); *B60Y 2200/92* (2013.01); *H01M 2220/20* (2013.01)

(58) Field of Classification Search
CPC .......... B60L 58/10; B60L 53/20; B60L 53/60; B60L 50/66; B60L 53/16; H01M 2220/20; H01M 10/482; H02J 7/0021; B60K 6/28; B60Y 2200/92
USPC ....................................................... 320/116
See application file for complete search history.

(56) References Cited

U.S. PATENT DOCUMENTS

| 2014/0188315 A1* | 7/2014 | Kang | ..................... B60L 3/0023 |
| | | | 701/22 |
| 2015/0006008 A1* | 1/2015 | Wei | ......................... B60L 1/003 |
| | | | 701/22 |

(Continued)

FOREIGN PATENT DOCUMENTS

JP          2012-222982 A       11/2012

*Primary Examiner* — Suresh Memula
(74) *Attorney, Agent, or Firm* — Oliff PLC

(57) ABSTRACT

A vehicle power supply device includes a relay controller. When a low voltage switching request is made to set a mode for supplying electric power from a switching module group to a low voltage power supply, the relay controller is configured to perform in sequence a first process of switching a first main relay and a second main relay to an open state, a second process of connecting a first switching relay to a second electrode terminal of the low voltage power supply and switching a second switching relay to a closed state, a third process of switching a precharge relay to a closed state and switching a third switching relay to a closed state, a fourth process of switching the second main relay to a closed state, and a fifth process of switching the precharge relay to an open state.

6 Claims, 5 Drawing Sheets

(51) Int. Cl.
  *B60L 53/16*    (2019.01)
  *B60L 53/60*    (2019.01)
  *B60L 50/60*    (2019.01)
  *H01M 10/48*    (2006.01)
  *B60L 53/20*    (2019.01)
  *B60K 6/28*     (2007.10)

(56) References Cited

U.S. PATENT DOCUMENTS

| | | | |
|---|---|---|---|
| 2017/0158062 A1* | 6/2017 | Emrani | B60L 58/15 |
| 2017/0274782 A1* | 9/2017 | Nomura | B60L 11/1811 |
| 2018/0072179 A1* | 3/2018 | Burkman | H02H 9/041 |
| 2019/0210588 A1* | 7/2019 | Murakami | B60W 20/11 |
| 2019/0232788 A1* | 8/2019 | Kimura | B60L 53/20 |
| 2019/0359079 A1* | 11/2019 | Mitsutani | B60L 58/20 |
| 2020/0086755 A1* | 3/2020 | Maruyama | B60L 50/51 |
| 2020/0114764 A1* | 4/2020 | Johnson | H02J 7/35 |
| 2020/0164766 A1* | 5/2020 | Tanaka | H01M 8/04 |
| 2020/0274375 A1* | 8/2020 | Griffiths | H02J 7/1423 |
| 2020/0328478 A1* | 10/2020 | Nozawa | B60L 50/66 |
| 2020/0338996 A1* | 10/2020 | Jang | B60L 58/12 |
| 2020/0376971 A1* | 12/2020 | Takemoto | B60L 50/66 |
| 2020/0400089 A1* | 12/2020 | Seong | F02N 11/087 |
| 2021/0016653 A1* | 1/2021 | Toda | B60K 6/52 |

\* cited by examiner

VEHICLE POWER SUPPLY DEVICE AND METHOD FOR CONTROLLING VEHICLE POWER SUPPLY DEVICE

BACKGROUND

1. Field

The present disclosure relates to a vehicle power supply device and a method for controlling a vehicle power supply device.

2. Description of Related Art

The vehicle power supply device disclosed in Japanese Laid-Open Patent Publication No. 2012-222982 includes a high voltage battery that supplies electric power to a high voltage auxiliary device such as a motor generator and a low voltage battery that supplies electric power to a low voltage auxiliary device such as an electric pump and an air conditioner. The high voltage battery includes battery modules that are connected in series. Of the battery modules in the high voltage battery, one or more of the battery modules located at a positive electrode side are each configured to be a positive electrode side module, and the remaining battery modules, which are located at a negative electrode side, are each configured to be a negative electrode side module.

The vehicle power supply device includes a first connector that is connected to the positive electrode terminal and the negative electrode terminal of the positive electrode side module. The first connector is configured to be coupled to a second connector that is electrically connected to the low voltage battery. In a state in which the second connector is coupled to the first connector, the positive electrode side module supplies electric power to the low voltage battery and the low voltage auxiliary device. Also, in a state in which the second connector is coupled to the first connector, the negative electrode side module supplies electric power to the high voltage auxiliary device.

In order to supply electric power from the positive electrode side module to, for example, the low voltage battery, the second connector needs to be manually coupled to the first connector. Control and operation that are generally performed before the connectors are manually coupled include, for example, deactivation of the vehicle system and electrical disconnection of the high voltage battery and the low voltage battery from the respective connectors. Thus, when the vehicle is traveling and electric power is to be supplied to, for example, the low voltage battery from the positive electrode side module, the power may not be promptly supplied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a vehicle power supply device that includes a high voltage battery, a low voltage power supply, a first main relay, a second main relay, a precharge circuit, a first switching relay, a second switching relay, a third switching relay, and a relay controller. The high voltage battery includes battery modules connected in series and is configured to supply electric power to a high voltage auxiliary device. Each of the battery modules has a first electrode terminal and a second electrode terminal. One of a first electrode and a second electrode is a positive electrode, and the other of the first electrode and the second electrode is a negative electrode. One or more of the battery modules form a switching module group. One of the battery modules configured to be connected to the second electrode terminal of the switching module group is a first battery module. The low voltage power supply has a lower voltage than the high voltage battery. The first main relay is configured to switch an electrical connection between the first electrode terminal of the high voltage battery and a first electrode terminal of the high voltage auxiliary device. The second main relay is configured to switch an electrical connection between the second electrode terminal of the high voltage battery and a second electrode terminal of the high voltage auxiliary device. The precharge circuit includes a precharge relay configured to switch an electrical connection and a resistor connected in series to the precharge relay. The precharge circuit is connected in parallel to the second main relay. The first switching relay is configured to selectively connect the second electrode terminal of the switching module group to one of the first electrode terminal of the first battery module and a second electrode terminal of the low voltage power supply. The second switching relay is configured to switch an electrical connection between the first electrode terminal of the switching module group and a first electrode terminal of the low voltage power supply. The third switching relay is configured to switch an electrical connection between the first electrode terminal of the first battery module and the first electrode terminal of the high voltage auxiliary device. The relay controller is configured to control the first main relay, the second main relay, the precharge relay, the first switching relay, the second switching relay, and the third switching relay. When a low voltage switching request is made to set a mode for supplying electric power from the switching module group to the low voltage power supply, the relay controller is configured to perform in sequence a first process of switching the first main relay and the second main relay to an open state, a second process of connecting the first switching relay to the second electrode terminal of the low voltage power supply and switching the second switching relay to a closed state, a third process of switching the precharge relay to a closed state and switching the third switching relay to a closed state, a fourth process of switching the second main relay to a closed state, and a fifth process of switching the precharge relay to an open state.

Another aspect of the present disclosure is a method for controlling a vehicle power supply device. The vehicle power supply device includes a high voltage battery, a low voltage power supply, a first main relay, a second main relay, a precharge circuit, a first switching relay, a second switching relay, and a third switching relay. The high voltage battery includes battery modules connected in series and is configured to supply electric power to a high voltage auxiliary device. Each of the battery modules has a first electrode terminal and a second electrode terminal. One of a first electrode and a second electrode is a positive electrode, and the other of the first electrode and the second electrode is a negative electrode. One or more of the battery modules form a switching module group. One of the battery modules configured to be connected to the second electrode terminal of the switching module group is a first battery module. The low voltage power supply has a lower voltage than the high voltage battery. The first main relay is configured to switch an electrical connection between the first electrode terminal of the high voltage battery and a first electrode terminal of the high voltage auxiliary device. The second main relay is configured to switch an electrical connection between the second electrode terminal of the high voltage battery and a second electrode terminal of the high voltage auxiliary device. The precharge circuit includes a precharge relay configured to switch an electrical connection and a resistor connected in series to the precharge relay. The precharge circuit is connected in parallel to the second main relay. The first switching relay is configured to selectively connect the second electrode terminal of the switching module group to one of the first electrode terminal of the first battery module and a second electrode terminal of the low voltage power supply. The second switching relay is configured to switch an electrical connection between the first electrode terminal of the switching module group and a first electrode terminal of the low voltage power supply. The third switching relay is configured to switch an electrical connection between the first electrode terminal of the first battery module and the first electrode terminal of the high voltage auxiliary device. The method includes performing in sequence, when a low voltage switching request is made to set a mode for supplying electric power from the switching module group to the low voltage power supply, a first process of switching the first main relay and the second main relay to an open state, a second process of connecting the first switching relay to the second electrode terminal of the low voltage power supply and switching the second switching relay to a closed state, a third process of switching the precharge relay to a closed state and switching the third switching relay to a closed state, a fourth process of switching the second main relay to a closed state, and a fifth process of switching the precharge relay to an open state.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a vehicle power supply device will now be described. More specifically, the vehicle power supply device is applied to a vehicle that includes a hybrid system. A schematic configuration of the hybrid system will now be described.

Figure 1:
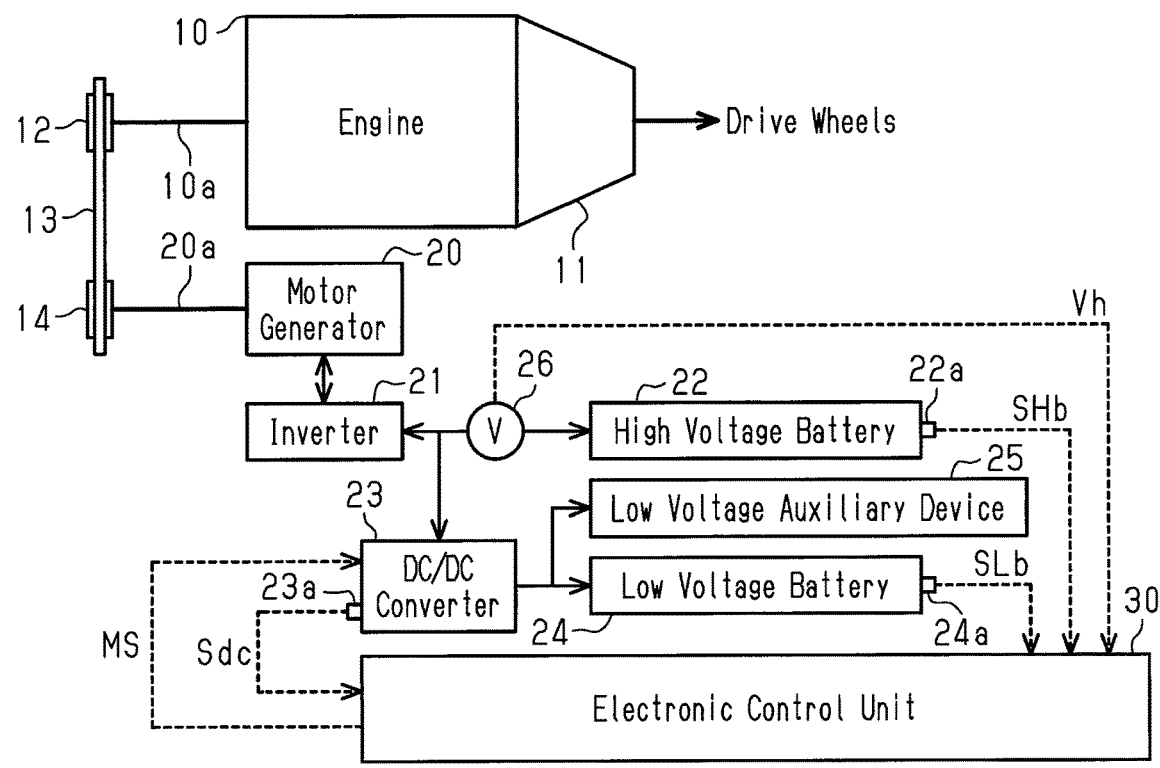
FIG. 1 is a schematic configuration diagram of a hybrid system.

As shown in FIG. 1, the hybrid system includes an engine 10, that is, a drive source of a vehicle. The engine 10 includes a crankshaft 10a that is drivingly connected to drive wheels via a transmission 11 and the like. The crankshaft 10a of the engine 10 is drivingly connected to a first pulley 12. A transmission belt 13 is wound around the first pulley 12. Although not shown in the drawings, the crankshaft 10a of the engine 10 is also drivingly connected to, for example, a hydraulic pump that generates hydraulic pressure and a compressor of an air conditioner via a belt, a pulley, a gear (e.g., a sprocket), a chain, or the like.

The hybrid system includes a motor generator 20, which is a drive source different from the engine 10. The motor generator 20 is a so-called three-phase AC motor. The motor generator 20 includes an output shaft 20a that is drivingly connected to a second pulley 14. The transmission belt 13 is wound around the second pulley 14. That is, the motor generator 20 is drivingly connected to the crankshaft 10a of the engine 10 via the second pulley 14, the transmission belt 13, and the first pulley 12.

When the motor generator 20 performs as an electric motor, the motor generator 20 applies a rotational torque to the second pulley 14. The rotational torque is input to the crankshaft 10a of the engine 10 via the transmission belt 13 and the first pulley 12. More specifically, in this case, the motor generator 20 assists the driving of the engine 10. When the motor generator 20 performs as a generator, a rotational torque of the crankshaft 10a of the engine 10 is input to the output shaft 20a of the motor generator 20 via the first pulley 12, the transmission belt 13, and the second pulley 14. The motor generator 20 generates electric power in accordance with the rotation of the output shaft 20a.

The motor generator 20 is connected to a high voltage battery 22 via an inverter 21. The inverter 21 is a bidirectional inverter. More specifically, the inverter 21 may convert an AC voltage that is generated by the motor generator 20 into a DC voltage and send the DC voltage to the high voltage battery 22 or may convert a DC voltage that is output from the high voltage battery 22 into an AC voltage and send the AC voltage to the motor generator 20. More specifically, when the inverter sends the AC voltage to the motor generator 20, the inverter 21 corresponds to a high voltage auxiliary device that receives the supply of electric power from the high voltage battery 22. In FIG. 1, the inverter 21 and the motor generator 20 are separately illustrated. However, the inverter 21 may be incorporated in a casing of the motor generator 20.

The high voltage battery 22 is, for example, a lithium-ion battery. When the motor generator 20 performs as an electric motor, the high voltage battery 22 supplies electric power to the motor generator 20. When the motor generator 20 performs as a generator, the high voltage battery 22 is charged with electric power supplied from the motor generator 20.

The high voltage battery 22 incorporates a sensor 22a that detects the state of the high voltage battery 22. The sensor 22a detects, for example, the current that is input to the high voltage battery 22 and the temperature of the high voltage battery 22. The sensor 22a outputs a signal indicating state information SHb of the high voltage battery 22 based on, for example, the input current of the high voltage battery 22 and the temperature of the high voltage battery 22.

The motor generator 20 is connected to a DC/DC converter 23 via the inverter 21. The DC/DC converter 23 is also connected to the high voltage battery 22. The DC/DC converter 23 steps down the DC voltage that is output from the inverter 21 and the high voltage battery 22 to 10 V to 15 V and outputs the voltage. The DC/DC converter 23 incorporates a sensor 23a that detects the state of the DC/DC converter 23. The sensor 23a obtains state information Sdc of the DC/DC converter 23, that is, detects, for example, the output voltage and the output current of the DC/DC converter 23. The sensor 23a outputs a signal indicating the state information Sdc of the DC/DC converter 23.

A low voltage battery 24, which corresponds to a low voltage power supply, is connected to the DC/DC converter 23. The low voltage battery 24 is, for example, a 12 V lead storage battery that has a lower voltage than the high voltage battery 22. When the DC/DC converter 23 is not driven or when the output voltage of the DC/DC converter 23 is 12 V, the low voltage battery 24 outputs a DC voltage of 12 V. When the output voltage of the DC/DC converter 23 is greater than the open circuit voltage (OCV) of the low voltage battery 24, the low voltage battery 24 is charged with electric power supplied from the DC/DC converter 23.

The low voltage battery 24 incorporates a sensor 24a that detects the state of the low voltage battery 24. The sensor 24a obtains state information SLb of the low voltage battery 24, that is, detects, for example, the current that is input to the low voltage battery 24 and the temperature of the low voltage battery 24. The sensor 24a outputs a signal indicating the state information SLb of the low voltage battery 24.

Various low voltage auxiliary devices 25 are connected to the DC/DC converter 23 and the low voltage battery 24. Examples of the low voltage auxiliary devices 25 include lighting devices such as a vehicle headlamp, a direction indicator lamp, a vehicle interior light and vehicle interior devices such as an electric pump for pumping cooling water, an air conditioner, a car navigation system, and a speaker. When the DC/DC converter 23 is not driven, each low voltage auxiliary device 25 receives electric power from the low voltage battery 24. When the output voltage of the DC/DC converter 23 is greater than the open circuit voltage (OCV) of the low voltage battery 24, the low voltage auxiliary device 25 receives electric power from the DC/DC converter 23.

The inverter 21, the high voltage battery 22, the DC/DC converter 23, and wires connecting them form a high voltage circuit. The high voltage circuit is connected to a voltmeter 26, which corresponds to a voltage detector that detects a voltage Vh in the high voltage circuit. The voltmeter 26 outputs a signal indicating the detected the voltage Vh of the high voltage circuit.

As shown in FIG. 1, the hybrid system includes an electronic control unit 30 that centrally controls the entire hybrid system. The electronic control unit 30 may be a processing circuit (e.g., a computer) including, for example, an arithmetic unit that executes various programs (applications), a nonvolatile storage unit that stores programs and the like, and a volatile memory that temporarily stores data when the programs are executed. The electronic control unit 30 may be configured to be circuitry including 1) one or more processors that operate in accordance with a computer program (software), 2) one or more dedicated hardware circuits such as application specific integrated circuits (ASICs) that execute at least one or more of various processes, or 3) a combination of these. The processor includes a CPU and memories such as a RAM and a ROM. The memory stores program codes or instructions configured to cause the CPU to execute processes. The memory, or a computer readable medium, includes any available media that can be accessed by a general-purpose or special-purpose computer. The electronic control unit 30 receives electric power from the low voltage battery 24.

The electronic control unit 30 receives a signal indicating the state information Sdc from the sensor 23a of the DC/DC converter 23. The electronic control unit 30 recognizes, for example, the output voltage and the output current of the DC/DC converter 23 based on the signal. Additionally, the electronic control unit 30 generates an operation signal MS for controlling the DC/DC converter 23 based on various signals input to the electronic control unit 30. The electronic control unit 30 sends the generated operation signal MS to the DC/DC converter 23.

The electronic control unit 30 determines whether or not an abnormality is present in the DC/DC converter 23 based on the state information Sdc, which is input, and the operation signal MS, which is output. The electronic control unit 30 determines that the DC/DC converter 23 has an abnormality when the output voltage and the output current of the DC/DC converter 23 that are expected from the operation signal MS deviate significantly from the output voltage and the output current that are actually detected by the sensor 23a. More specifically, while the electronic control unit 30 outputs the operation signal MS so that the DC/DC converter 23 sends electric power to the low voltage battery 24, when the output voltage and the output current that are actually detected by the sensor 23a are zero, the electronic control unit 30 determines that the DC/DC converter 23 has an abnormality.

The electronic control unit 30 receives a signal indicating the state information SHb from the sensor 22a of the high voltage battery 22. The electronic control unit 30 calculates the fully-charged state and the state of charge (SOC) of the high voltage battery 22 based on information such as the input current and temperature of the high voltage battery 22 included in the state information SHb. In the present embodiment, the fully-charged state of the high voltage battery 22 refers to the maximum capacity to which the high voltage battery 22 can be charged at the time when the state information SHb is input, and is represented by, for example, ampere hour (Ah). The state of charge indicates the ratio of the charged state of the high voltage battery 22 to the fully-charged state of the high voltage battery 22 at the time when the state information SHb is input, and is represented by, for example, a percentage (%).

The electronic control unit 30 also receives a signal indicating the state information SLb from the sensor 24a of the low voltage battery 24. As in the above-described high voltage battery 22, the electronic control unit 30 calculates the fully-charged state of the low voltage battery 24 and the state of charge in relation to the fully-charged state of the low voltage battery 24.

The storage unit of the electronic control unit 30 stores a target range of the state of charge of the high voltage battery 22 and a target range of the state of charge of the low voltage battery 24. The target range of the state of charge of the high voltage battery 22 is, for example, a range of 40% to 70%. The target range of the state of charge of the low voltage battery 24 is, for example, a range of 80% to 95%.

The high voltage battery 22 includes battery modules BM. The electronic control unit 30 generates a low voltage switching request signal that indicates whether or not to supply electric power to the low voltage battery 24 from one or more of the battery modules BM. More specifically, the low voltage switching request is a request for setting a mode for supplying electric power to the low voltage battery 24 from one or more of the battery modules BM, which are included in the high voltage battery 22. In the present embodiment, the electronic control unit 30 makes the low voltage switching request when all of the conditions are satisfied in which the DC/DC converter 23 has an abnormality, the state of charge of the high voltage battery 22 is within the target range, and the state of charge of the low voltage battery 24 is less than the lower limit value of the target range. When the low voltage switching request is made, the electronic control unit 30 sets the low voltage switching request signal to a high level. When the low voltage switching request is not made, the electronic control unit 30 sets the low voltage switching request signal to a low level (e.g., the ground potential).

The circuit configuration of the vehicle power supply device including the high voltage battery 22 and the low voltage battery 24 will be described. In each of the members of the embodiments below, the positive electrode terminal corresponds to the first electrode terminal, and the negative electrode terminal corresponds to the second electrode terminal. The ground potential is not shown in FIGS. 2 and 4 to 6.

Figure 2:
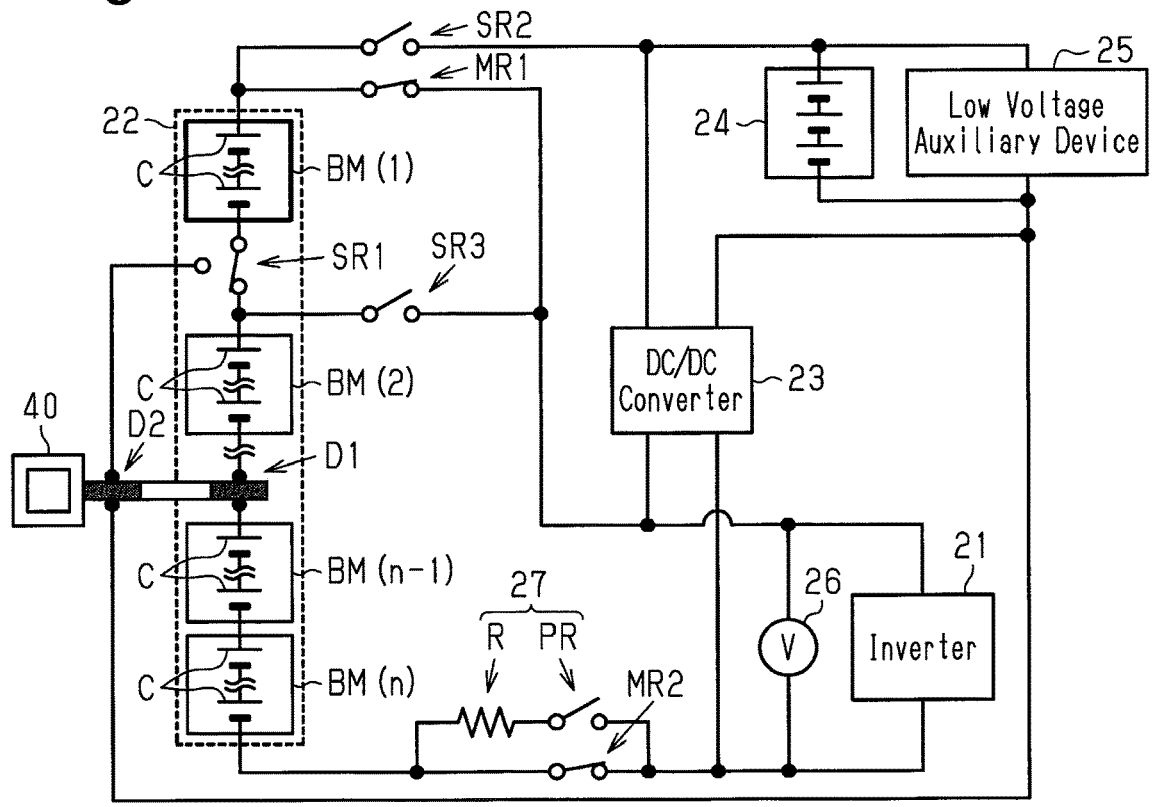
FIG. 2 is a circuit diagram of a vehicle power supply device in a case in which a low voltage switching request is made.

As shown in FIG. 2, the high voltage battery 22 includes n battery modules BM that are connected in series. In the following description, when a specific one of the battery modules BM is referred to, the battery module BM(1), the battery module BM(2), . . . , the battery module BM(n−1), and the battery module BM(n) are sequentially referred to from the battery module BM located at the most positive electrode side.

Each battery module BM includes battery cells C (unit cells) that are connected in series. The output voltage of each battery cell C is approximately 3.2 V to 3.8 V. In the present embodiment, each battery module BM includes four battery cells C. Thus, the output voltage of each battery module BM is approximately 12.8 V to 15.2 V.

The positive electrode terminal of the high voltage battery 22 may be connected to the positive electrode terminal of the inverter 21 with a wire. The negative electrode terminal of the high voltage battery 22 may be connected to the negative electrode terminal of the inverter 21 with a wire. The voltmeter 26 is connected in parallel to the inverter 21. Thus, the voltmeter 26 detects the voltage Vh of the high voltage circuit, that is, the voltage between the positive and negative terminals of the inverter 21, which is the high voltage auxiliary device.

A first main relay MR1 is arranged on the wire connecting the positive electrode terminal of the high voltage battery 22 and the positive electrode terminal of the inverter 21 and is configured to switch the electrical connection between the positive electrode terminal of the high voltage battery 22 and the positive electrode terminal of the inverter 21. A second main relay MR2 is arranged on the wire connecting the negative electrode terminal of the high voltage battery 22 and the negative electrode terminal of the inverter 21 and is configured to switch the electrical connection between the negative electrode terminal of the high voltage battery 22 and the negative electrode terminal of the inverter 21. Both the first main relay MR1 and the second main relay MR2 are switched between an open state and a closed state by the electronic control unit 30. That is, the electronic control unit 30 corresponds to a relay controller that controls the first main relay MR1 and the second main relay MR2.

A precharge circuit 27 is connected in parallel to the second main relay MR2 between the negative electrode terminal of the high voltage battery 22 and the negative electrode terminal of the inverter 21. The precharge circuit 27 includes a precharge relay PR configured to switch the electrical connection and a resistor R connected in series to the precharge relay PR.

The positive electrode terminal and the negative electrode terminal of the high voltage battery 22 are each connected to the high voltage terminal of the DC/DC converter 23. The positive electrode terminal and the negative electrode terminal of the low voltage battery 24 are each connected to the low voltage terminal of the DC/DC converter 23. Various low voltage auxiliary devices 25 may be connected in parallel to the low voltage battery 24. More specifically, various low voltage auxiliary devices 25 may be connected to the positive electrode terminal and the negative electrode terminal of the low voltage battery 24. FIG. 2 shows only one of the low voltage auxiliary devices 25.

The negative electrode terminal of the battery module BM(1) configured to be the high voltage battery 22 may be connected to the negative electrode terminal of the low voltage battery 24 with a wire. The negative electrode terminal of the battery module BM(1) is provided with a first switching relay SR1 for switching the connection destination of the negative electrode terminal of the battery module BM(1). The first switching relay SR1 switches the connection destination of the negative electrode terminal of the battery module BM(1) to one of the positive electrode terminal of the battery module BM(2) and the negative electrode terminal of the low voltage battery 24. More specifically, the first switching relay SR1 is configured to selectively connect the negative electrode terminal of the battery module BM(1) to one of the positive electrode terminal of the battery module BM(2) and the negative electrode terminal of the low voltage battery 24. The connection destination of the first switching relay SR1 is switched by the electronic control unit 30. That is, the electronic control unit 30 corresponds to a relay controller that controls the precharge relay PR.

The positive electrode terminal (the positive electrode terminal of the high voltage battery 22) of the battery module BM(1) may be connected to the positive electrode terminal of the low voltage battery 24 with a wire. A second switching relay SR2 is arranged on the wire connecting the positive electrode terminal of the battery module BM(1) and the positive electrode terminal of the low voltage battery 24 to switch the electrical connection between the positive electrode terminal of the battery module BM(1) and the positive electrode terminal of the low voltage battery 24. The second switching relay SR2 is switched between an open state and a closed state by the electronic control unit 30. That is, the electronic control unit 30 corresponds to a relay controller that controls the second switching relay SR2.

The positive electrode terminal of the battery module BM(2) adjacent to the battery module BM(1) at the negative electrode side of the battery module BM(1) may be connected to the positive electrode terminal of the inverter 21 with a wire. A third switching relay SR3 is provided on a wire connecting the positive electrode terminal of the battery module BM(2) and the positive electrode terminal of the inverter 21 to switch the electrical connection between the positive electrode terminal of the battery module BM(2) and the positive electrode terminal of the inverter 21. The third switching relay SR3 is switched between an open state and a closed state by the electronic control unit 30. That is, the electronic control unit 30 corresponds to a relay controller that controls the third switching relay SR3.

Figure 3:
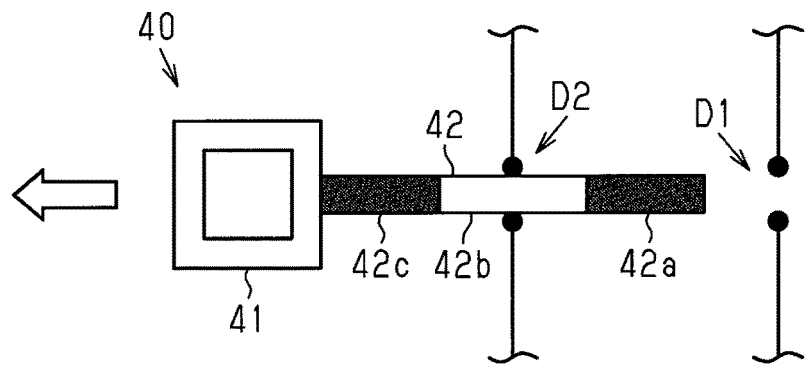
FIG. 3 is a circuit diagram in the vicinity of a service plug when the service plug is operated.

As shown in FIGS. 2 and 3, a first disconnection portion D1 having a disconnected wire is arranged between the two adjacent battery modules BM in the high voltage battery 22. In the present embodiment, the first disconnection portion D1 is arranged on the positive electrode of the battery module BM(n−1). A second disconnection portion D2 having a disconnected wire is arranged between the first switching relay SR1 and the negative electrode terminal of the low voltage auxiliary device 25.

As shown in FIG. 3, a service plug 40 is arranged between the first disconnection portion D1 and the second disconnection portion D2. The service plug 40 includes an operation portion 41 that can be held with fingers and a rod-shaped plug main body 42 that extends from the operation portion 41. The distal end portion of the plug main body 42 is a conductive first connection portion 42a. The first connection portion 42a has an outer surface of a synthetic resin not having conductivity, and the outer surface is coated with a conductive metal (e.g., copper). An intermediate portion of the plug main body 42 is an insulation portion 42b having no conductivity. The intermediate portion of the plug main body 42 is located closer to the operation portion 41 than the first connection portion 42a. The first connection portion 42a is coated with metal. The insulation portion 42b is not coated with metal and includes an exposed synthetic resin. The proximal end portion of the plug main body 42 is a conductive second connection portion 42c. The proximal end portion of the plug main body 42 is located closer to the operation portion 41 than the insulation portion 42b. The second connection portion 42c has an outer surface of a synthetic resin, and the outer surface is coated with a conductive metal as in the above-described first connection portion 42a.

The service plug 40 is attached to a casing (not shown) that houses the high voltage battery 22 or a casing that houses the entire vehicle power supply device including the high voltage battery 22 and the low voltage battery 24. In a state in which the service plug 40 is attached to the casing, the operation portion 41 of the service plug 40 is exposed to the outside of the casing, and the service plug 40 may be operated with the operation portion 41.

As shown in FIG. 2, in a state in which the service plug 40 is attached to the casing, the first connection portion 42a of the service plug 40 is located at the first disconnection portion D1, and the first disconnection portion D1 is electrically connected. In a state in which the service plug 40 is attached to the casing, the second connection portion 42c of the service plug 40 is located at the second disconnection portion D2, and the second disconnection portion D2 is electrically connected.

As shown in FIG. 3, when the operation portion 41 is gripped and pulled out, the service plug 40 is movable relative to the casing in the axial direction of the plug main body 42. In a state in which the service plug 40 is operated and moved, the service plug 40 (more specifically, the first connection portion 42a) is not located at the first disconnection portion D1. As a result, the first disconnection portion D1 is released from the electrical connection and is in a disconnection state. When the service plug 40 is operated and moved, the insulation portion 42b, instead of the second connection portion 42c, is located at the second disconnection portion D2. As a result, the second disconnection portion D2 is released from the electrical connection and is in a disconnection state.

In a state in which the low voltage switching request is not made, that is, when the low voltage switching request signal is at the low level, the electronic control unit 30 controls each relay so that electric power is supplied to the inverter 21 from each of the battery modules BM of the high voltage battery 22. More specifically, as shown in FIG. 2, in a state in which the low voltage switching request is not made, both the first main relay MR1 and the second main relay MR2 are in a closed state, and the precharge relay PR is in an open state. The first switching relay SR1 is connected to the positive electrode terminal of the battery module BM(2). Both the second switching relay SR2 and the third switching relay SR3 are in an open state.

In a state in which the relays are controlled as described above, as shown in FIG. 4, a high voltage closed circuit is formed extending from the positive electrode terminal of the high voltage battery 22 to the negative electrode terminal of the high voltage battery 22 through the first main relay MR1 that is in a closed state, the inverter 21, and the second main relay MR2 that is in a closed state. The high voltage closed circuit is connected via the DC/DC converter 23 to a low voltage closed circuit that is formed by the low voltage battery 24 and the low voltage auxiliary device 25. In this state, when the service plug 40 is operated and moved, the high voltage closed circuit is disconnected in the high voltage battery 22 and becomes an open circuit.

In a state in which the low voltage switching request is made, that is, when the low voltage switching request signal is at the high level, the electronic control unit 30 controls the relays so that electric power is supplied to the low voltage battery 24 from the battery module BM(1), which is included in the battery modules BM of the high voltage battery 22. Additionally, the electronic control unit 30 controls the relays so that electric power is supplied to the inverter 21 from the battery modules BM(2) to BM(n). As described above, in the present embodiment, the battery module BM(1) is a "switching module group" configured to selectively supply electric power to one of the inverter 21 and the low voltage battery 24. That is, the destination of electric power supplied from the battery module BM(1) may be switched to one of the inverter 21 and the low voltage battery 24. The battery modules BM(2) to BM(n) are a battery module group that is located at a negative electrode side of the switching module group.

Figure 5:
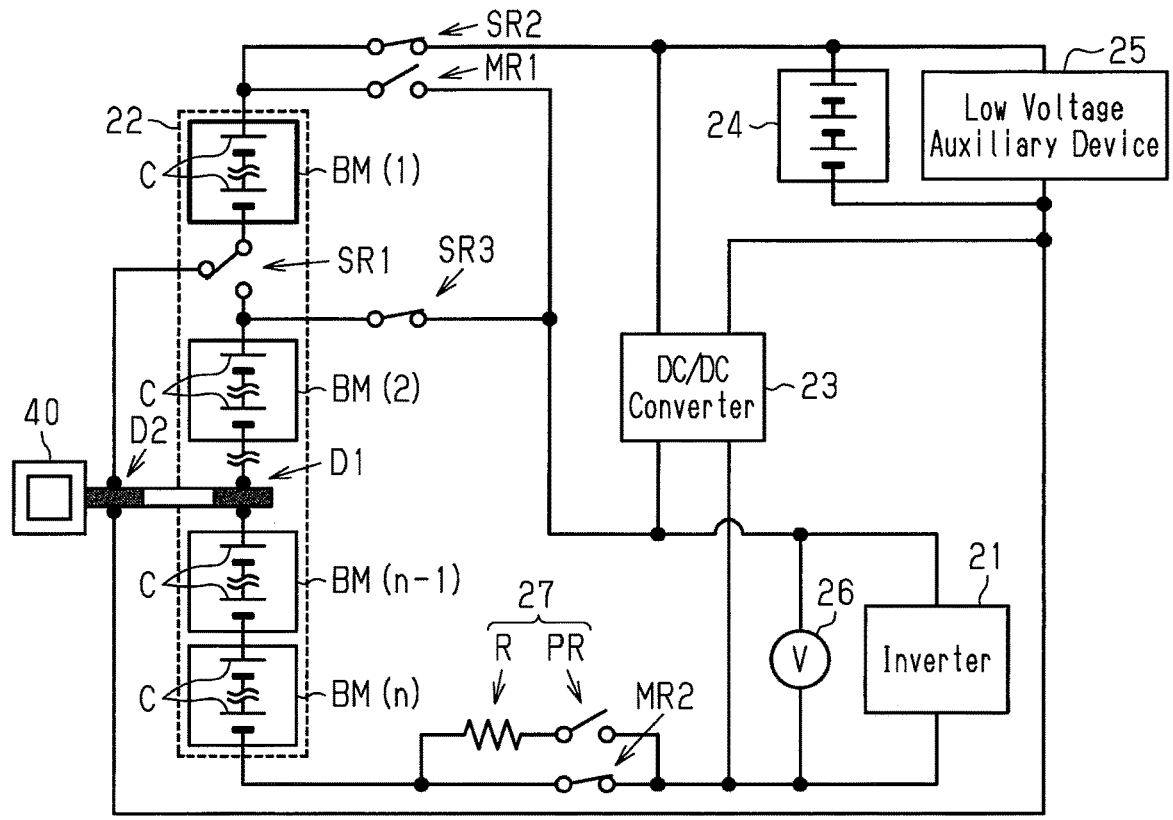
FIG. 5 is a circuit diagram of a vehicle power supply device in a case in which the low voltage switching request is made.
Figure 6:
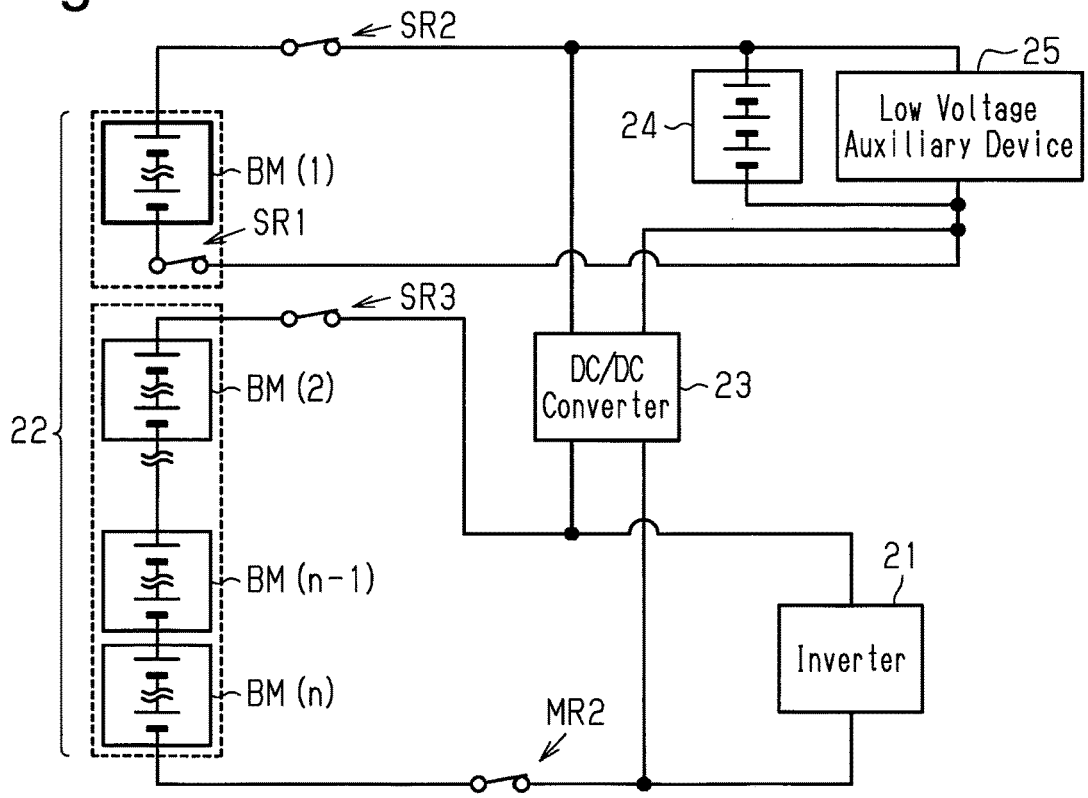
FIG. 6 is a schematic circuit diagram showing a connection state in a case in which the low voltage switching request is made.

As shown in FIG. 5, in a state in which the low voltage switching request is made, the first main relay MR1 is in an open state, the second main relay MR2 is in a closed state, and the precharge relay PR is in an open state. The first switching relay SR1 is connected to the negative electrode terminal of the low voltage battery 24. The second switching relay SR2 and the third switching relay SR3 are both in a closed state.

When the relays are controlled as described above, as shown in FIG. 6, a high voltage closed circuit is formed extending from the positive electrode terminal of the battery module BM(2) in the high voltage battery 22 to the negative electrode terminal of the battery module BM(n) through the third switching relay SR3 that is in a closed state, the inverter 21, and the second main relay MR2 that is in a closed state. Also, a low voltage closed circuit is formed extending from the positive electrode terminal of the battery module BM(1) in the high voltage battery 22 to the negative electrode terminal of the battery module BM(1) through the second switching relay SR2 that is in a closed state, the low voltage battery 24, and the first switching relay SR1. The high voltage closed circuit is connected to the low voltage closed circuit via the DC/DC converter 23.

In this state, when the service plug 40 is operated and moved, the high voltage closed circuit is disconnected at the positive electrode side of the battery module BM(n−1) in the high voltage battery 22 and becomes an open circuit. The low voltage closed circuit is also disconnected between the negative electrode terminal of the battery module BM(1) and the low voltage battery 24 and becomes an open circuit.

A relay switching process executed by the electronic control unit 30 on each relay will now be described in detail. In a state in which a main switch of the vehicle is turned on and the system of the vehicle is activated, the relay switching process is executed in predetermined cycles. The main switch may be referred to as, for example, a system activation switch or an ignition switch. The execution cycle is set to be sufficiently longer than a specified time Tx, which will be described later.

Figure 7:
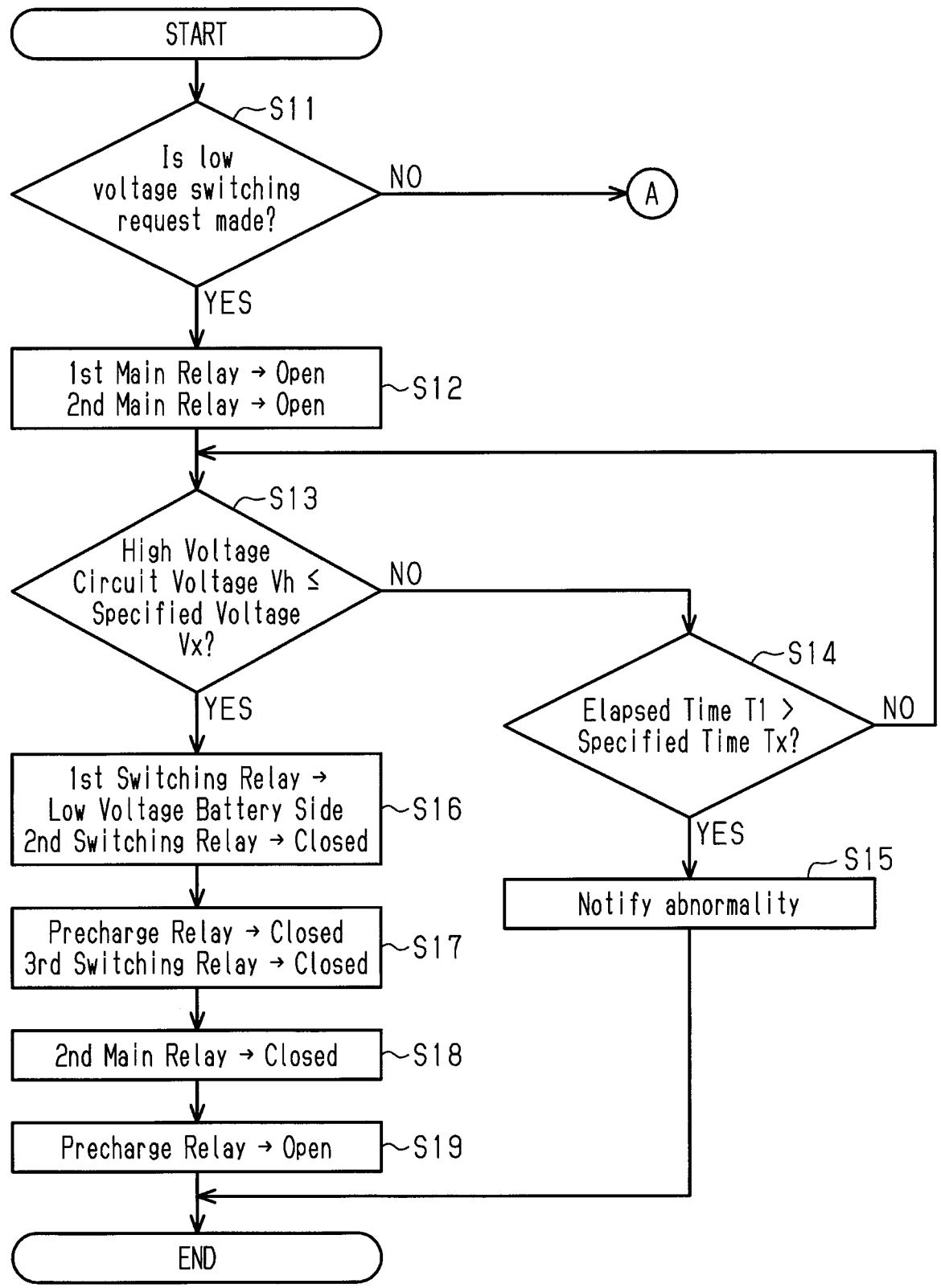
FIG. 7 is a flowchart showing a relay switching process.

As shown in FIG. 7, when the relay switching process is executed, the process of the electronic control unit 30 proceeds to step S11. In step S11, the electronic control unit 30 determines whether the low voltage switching request is switched from an absence state to a presence state. More specifically, when the low level of the low voltage switching request signal is detected in the previous relay switching process and the high level is detected in the current relay switching process, the electronic control unit 30 determines that a state in which the low voltage switching request is not made is switched to a state in which the low voltage switching request is made.

When the low voltage switching request is not made in the previous relay switching process, the state of each relay is in the state shown in FIG. 2 at the time of step S11 in the current relay switching process. In a case in which the relay switching process is initially performed after the vehicle is manufactured or information on the level of the low voltage switching request signal in the previous relay switching process is lost, it is assumed that the low voltage switching request is not made in the previous relay switching process (the low voltage switching request signal is at the low level). When it is determined that the state in which the low voltage switching request is not made is switched to the state in which the low voltage switching request is made (step S11: YES), the process of the electronic control unit 30 proceeds to step S12.

In step S12, the electronic control unit 30 switches the first main relay MR1 to an open state. The electronic control unit 30 switches the second main relay MR2 to an open state. Thereafter, the process of the electronic control unit 30 proceeds to step S13.

In step S13, the electronic control unit 30 determines whether the voltage Vh of the high voltage circuit detected by the voltmeter 26 is less than or equal to a predetermined specified voltage Vx. The specified voltage Vx is set to be less than the output voltage of the low voltage battery 24 and is zero in the present embodiment. When it is determined that the voltage Vh of the high voltage circuit is greater than the specified voltage Vx, the process of the electronic control unit 30 proceeds to step S14.

In step S14, the electronic control unit 30 determines whether an elapsed time T1 from the point in time when the process of step S12 is executed to switch the first main relay MR1 and the second main relay MR2 to an open state is greater than the predetermined specified time Tx. The specified time Tx is set to be greater than the time for the voltage Vh of the high voltage circuit to be decreased from the output voltage of the high voltage battery 22 to the specified voltage Vx (zero) when the first main relay MR1 and the second main relay MR2 are normally switched to an open state. For example, the specified time Tx is set in units of millisecond. When it is determined that the elapsed time T1 is less than or equal to the specified time Tx (step S14: NO), the process of the electronic control unit 30 returns to step S13.

Steps S13 and S14 are repeated until the voltage Vh of the high voltage circuit becomes less than or equal to the specified voltage Vx. Since the specified time Tx is sufficiently shorter than the execution cycle of the relay switching process, the relay switching process will not be newly executed from step S11 while steps S13 and S14 are repeatedly executed.

In step S14, when it is determined that the elapsed time T1 is greater than the specified time Tx (step S14: YES), the process of the electronic control unit 30 proceeds to step S15. In step S15, the electronic control unit 30 determines that the first main relay MR1 and the second main relay MR2 are not performing normally due to, for example, seizing. The electronic control unit 30 issues a notification of the abnormal switching operation of the first main relay MR1 and the second main relay MR2. Modes of notifying the abnormality include, for example, showing the warning on a display of the vehicle, issuing a warning sound or voice, and illuminating an indicator. Thereafter, the relay switching process of the electronic control unit 30 ends.

In step S13, when it is determined that the voltage Vh of the high voltage circuit is less than or equal to the specified voltage Vx (step S13: YES), the process of the electronic control unit 30 proceeds to step S16. In step S16, the electronic control unit 30 switches the connection destination of the first switching relay SR1 from the positive electrode terminal of the battery module BM(2) to the negative electrode terminal of the low voltage battery 24. That is, in step S16, the electronic control unit 30 connects the first switching relay SR1 to the negative electrode terminal of the low voltage battery 24. Additionally, the electronic control unit 30 switches the second switching relay SR2 to a closed state. Thereafter, the process of the electronic control unit 30 proceeds to step S17.

In step S17, the electronic control unit 30 switches the precharge relay PR to a closed state. Additionally, the electronic control unit 30 switches the third switching relay SR3 that is connected in series to the precharge relay PR to a closed state. Thereafter, the process of the electronic control unit 30 proceeds to step S18.

In step S18, the electronic control unit 30 switches the second main relay MR2 that is connected in parallel to the precharge relay PR to a closed state. In the subsequent step S19, the electronic control unit 30 switches the precharge relay PR to an open state. Thereafter, the relay switching process of the electronic control unit 30 ends. The series of processes of steps S12 to S19 switches, the state of each relay of the vehicle power supply device from the state shown in FIG. 2 to the state shown in FIG. 5.

Figure 8:
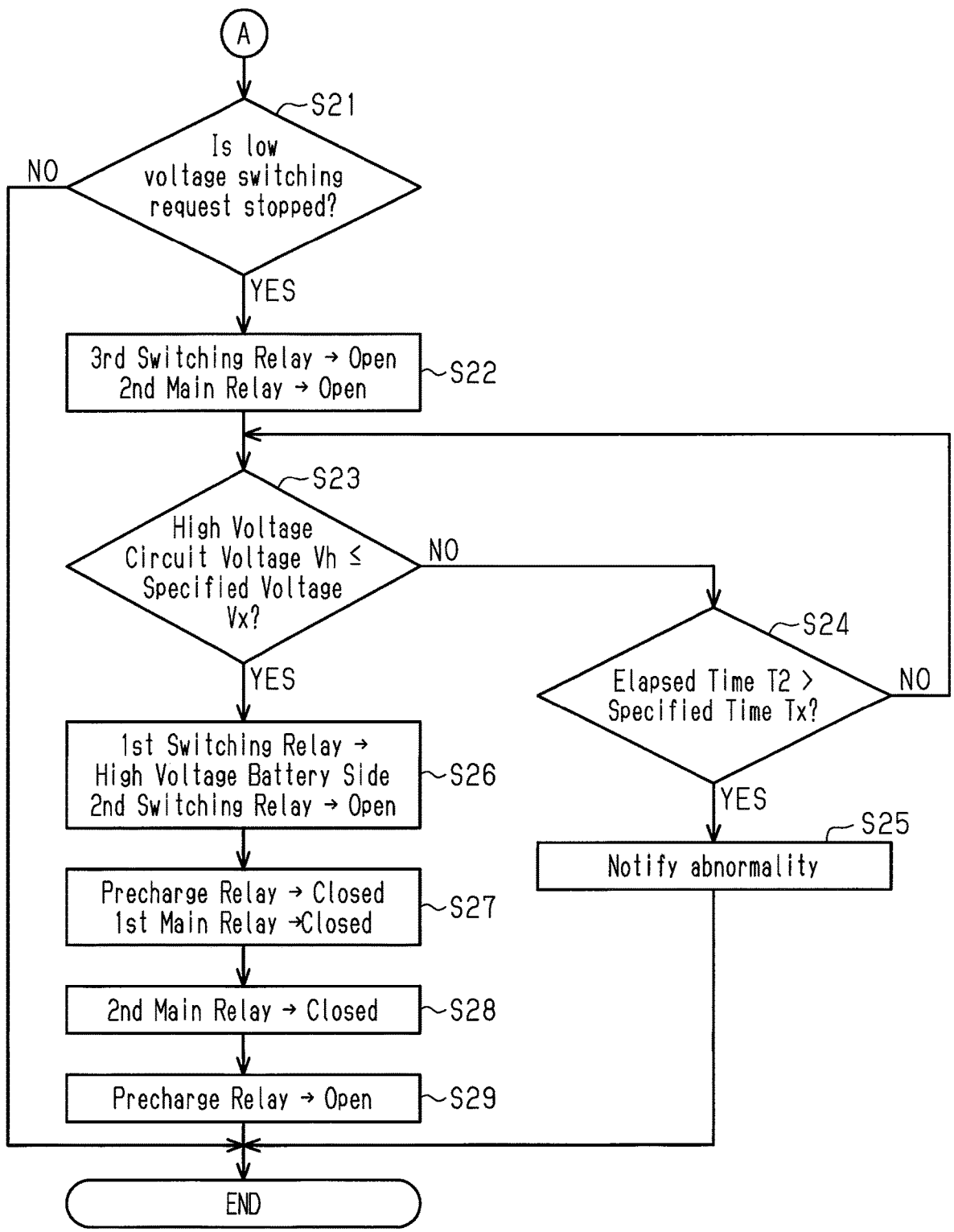
FIG. 8 is a flowchart showing a relay switching process.

When it is determined in step S11 that the low voltage switching request is not switched from the absence state to the presence state (step S11: NO), the process of the electronic control unit 30 proceeds to step S21 shown in FIG. 8. In step S21, the electronic control unit 30 determines whether the low voltage switching request is switched from the presence state to the absence state. More specifically, when the high level of the low voltage switching request signal is detected in the previous relay switching process and the low level is detected in the current relay switching process, the electronic control unit 30 determines that a state in which the low voltage switching request is made is switched to a state in which the low voltage switching request is not made. When the low voltage switching request is made in the previous relay switching process, the state of each relay is the state shown in FIG. 5 at the time of step S21 in the current relay switching process.

When it is determined that the low voltage switching request is not switched from the presence state to the absence state (step S21: NO), that is, the presence/absence state of the low voltage switching request has not been switched from the previous relay switching process, the relay switching process of the electronic control unit 30 ends. When it is determined that the low voltage switching request is switched from the presence state to absence state (step S21: YES), the process of the electronic control unit 30 proceeds to step S22.

In step S22, the electronic control unit 30 switches the third switching relay SR3 to an open state. The electronic control unit 30 switches the second main relay MR2 to an open state. Thereafter, the process of the electronic control unit 30 proceeds to step S23.

In the same manner as step S13, in step S23, the electronic control unit 30 determines whether the voltage Vh of the high voltage circuit detected by the voltmeter 26 is less than or equal to the specified voltage Vx. When it is determined that the voltage Vh of the high voltage circuit is greater than the specified voltage Vx, the process of the electronic control unit 30 proceeds to step S24.

In step S24, the electronic control unit 30 determines whether an elapsed time T2 from the point in time when the process of step S22 is executed to switch the third switching relay SR3 and the second main relay MR2 to an open state is greater than a predetermined specified time Tx. The specified time Tx is set to be greater than the time for the voltage Vh of the high voltage circuit to be decreased from the voltage (series voltage) of the battery modules BM(2) to BM(n) in the high voltage battery 22 to the specified voltage Vx (zero) when the third switching relay SR3 and the second main relay MR2 are normally switched to an open state. In the present embodiment, the specified voltage Vx that is used in step S24 is set to be the same value as the specified voltage Vx that is used in step S14. When it is determined that the elapsed time T2 is less than or equal to the specified time Tx (step S24: NO), the process of the electronic control unit 30 returns to step S23.

In the same manner as steps S13 and S14, steps S23 and S24 are repeatedly executed until the voltage Vh of the high voltage circuit becomes less than or equal to the specified voltage Vx. During the repetitive execution of these processes, the relay switching process will not be newly executed from step S11.

In step S24, when it is determined that the elapsed time T2 is greater than the specified time Tx (step S24: YES), the process of the electronic control unit 30 proceeds to step S25. In step S25, the electronic control unit 30 determines that the third switching relay SR3 and the second main relay MR2 are not performing normally due to, for example, seizing. The electronic control unit 30 issues a notification of the abnormal switching operation of the third switching relay SR3 and the second main relay MR2. Thereafter, the relay switching process of the electronic control unit 30 ends.

In step S23, when it is determined that the voltage Vh of the high voltage circuit is less than or equal to the specified voltage Vx (step S23: YES), the process of the electronic control unit 30 proceeds to step S26. In step S26, the electronic control unit 30 switches the connection destination of the first switching relay SR1 from the negative electrode terminal of the low voltage battery 24 to the positive electrode terminal of the battery module BM(2). That is, in step S26, the electronic control unit 30 connects the first switching relay SR1 to the positive electrode terminal of the battery module BM(2). Additionally, the electronic control unit 30 switches the second switching relay SR2 to an open state. Thereafter, the process of the electronic control unit 30 proceeds to step S27.

In step S27, the electronic control unit 30 switches the precharge relay PR to a closed state. Additionally, the electronic control unit 30 switches the first main relay MR1 that is connected in series to the precharge relay PR to a closed state. Thereafter, the process of the electronic control unit 30 proceeds to step S28.

In step S28, the electronic control unit 30 switches the second main relay MR2 that is connected in parallel to the precharge relay PR to a closed state. In the subsequent step S29, the electronic control unit 30 switches the precharge relay PR to an open state. Thereafter, the relay switching process of the electronic control unit 30 ends. The series of processes of steps S22 to S29 switches the state of each relay of the vehicle power supply device from the state shown in FIG. 5 to the state shown in FIG. 2.

The operation and effects of the present embodiment will now be described.

In the above embodiment, electric power is supplied from the motor generator 20 or the high voltage battery 22 to the low voltage battery 24 via the DC/DC converter 23. Thus, if an abnormality occurs in the DC/DC converter 23 and the supply of electric power to the low voltage battery 24 is interrupted, the state of charge of the low voltage battery 24 may be decreased below the lower limit value of the target range. In particular, in the above embodiment, the electronic control unit 30, which centrally controls the entire hybrid system, receives electric power from the low voltage battery 24. Thus, when the state of charge of the low voltage battery 24 is excessively decreased, control performed by the electronic control unit 30 on the vehicle power supply device may become destabilized or the electronic control unit 30 may not be able to perform the control. When an abnormality occurs in the DC/DC converter 23 and the state of charge of the low voltage battery 24 is decreased, the situation may be resolved as quickly as possible even while the vehicle is traveling so that the electronic control unit 30 stably controls the vehicle power supply device.

In the above embodiment, when a condition such as occurrence of an abnormality in the DC/DC converter 23 is satisfied, the battery module BM(1), which is located at the most positive-electrode side among the battery modules BM in the high voltage battery 22, is connected to the low voltage battery 24. As described above, one or more of the battery modules BM in the high voltage battery 22 are used as the power source of a low voltage side circuit. This limits excessive decreases in the state of charge of the low voltage battery 24 when an abnormality occurs in the DC/DC converter 23.

Moreover, in the above embodiment, the electronic control unit 30 controls the switching of each relay that separates the battery module BM(1) in the high voltage battery 22 from the remaining battery modules BM(2) to BM(n) and the switching of each relay that performs the precharging to limit consequent quick increases in voltage. In other words, manual operation is not needed when the battery module BM(1) of the high voltage battery 22 is connected to the low voltage battery 24. Thus, even when an abnormality occurs in the DC/DC converter 23 in a situation in which manual operation cannot be performed, for example, when the vehicle is traveling, the battery module BM(1) can promptly be connected to the low voltage battery 24. That is, in a case in which electric power from the battery module BM(1) is to be supplied to the low voltage auxiliary device 25 in a situation in which manual operation cannot be performed, for example, when the vehicle is traveling, the situation will promptly be resolved.

Furthermore, in the above embodiment, the output voltage of each battery module BM in the high voltage battery 22 is about 12.8 V to 15.2 V, which is close to the output voltage of the low voltage battery 24. Thus, when the battery module BM(1) is connected to the low voltage battery 24, an excessively large voltage will not be applied to the low voltage battery 24.

When the battery module BM(1) of the high voltage battery 22 is connected to the low voltage battery 24, the inverter 21 is supplied with electric power from the battery modules BM(2) to BM(n) of the high voltage battery 22. Thus, the voltage supplied to the inverter 21 is decreased by about the voltage of one battery module BM. Even when the voltage is somewhat decreased at the high voltage side as described above, the motor generator 20 is still operable without any major issues. The output voltage of the entire high voltage battery 22 may not be supplied to the motor generator 20 in order to control the motor generator 20. However, the output voltage of the entire high voltage battery 22 may be supplied to the motor generator 20.

In the above embodiment, for example, when the abnormality of the DC/DC converter 23 is eliminated and the low voltage switching request is not made, the electronic control unit 30 controls the switching of each relay that separates the battery module BM(1) from the low voltage battery 24 and the switching of each relay that performs the precharging. Thus, for example, even in a situation in which manual operation cannot be performed, for example, when the vehicle is traveling, when the abnormality of the DC/DC converter 23 is eliminated, the battery module BM(1) is quickly connected to the remaining battery modules BM(2) to BM(n). That is, for example, even in a situation in which manual operation cannot be performed, for example, when the vehicle is traveling, the situation will quickly be resolved when it becomes unnecessary to supply electric power from the battery module BM(1) to the low voltage auxiliary device 25.

In the above embodiment, when the low voltage switching request is switched from the absence state to the presence state and the voltage Vh of the high voltage circuit is not decreased to the specified voltage Vx within the specified time Tx, a notification of the abnormality of the first main relay MR1 and the second main relay MR2 is issued. Thus, the driver of the vehicle is promptly notified that the battery module BM(1) of the high voltage battery 22 cannot be connected to the low voltage battery 24. In this regard, when the low voltage switching request is switched from the presence state to the absence state, the driver of the vehicle is also notified of the abnormality of the third switching relay SR3 and the second main relay MR2.

In the above embodiment, after the first main relay MR1 and the second main relay MR2 are switched to an open state in step S12 and the voltage Vh of the high voltage circuit becomes less than or equal to the predetermined specified voltage Vx, the subsequent switching of each relay is performed. Thus, when the connection destination of the first switching relay SR1 is switched to the negative electrode terminal of the low voltage battery 24 and the second switching relay SR2 is switched to a closed state, application of an excessively high voltage to the low voltage battery 24 and the low voltage auxiliary device 25 is limited.

In the above embodiment, when an abnormality occurs in the DC/DC converter 23, the DC/DC converter 23 may need to be repaired or replaced at a vehicle maintenance shop or the like. In performing such an operation, the closed circuit including the high voltage battery 22 is generally switched to an open circuit so that no current flows from the high voltage battery 22.

Figure 4:
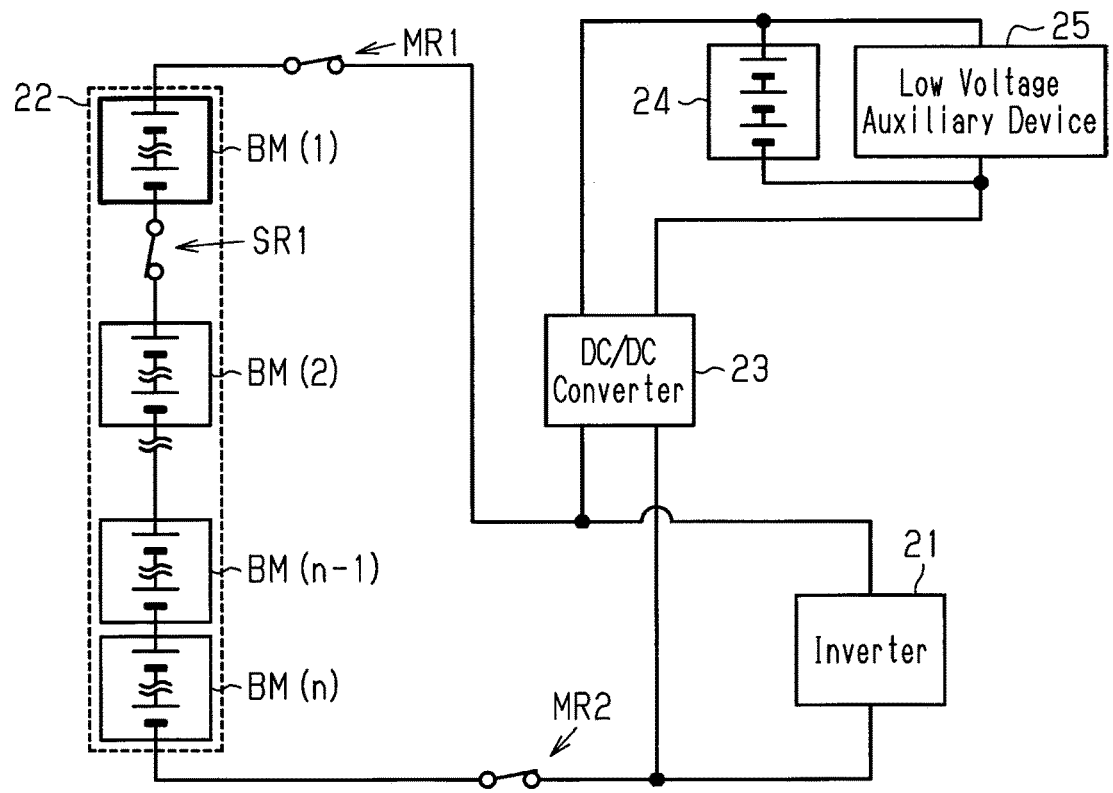
FIG. 4 is a schematic circuit diagram showing a connection state in a case in which the low voltage switching request is not made.

In the above embodiment, as shown in FIG. 4, when a condition such as occurrence of an abnormality in the DC/DC converter 23 is satisfied, the closed circuit including the battery module BM(1) of the high voltage battery 22 and the closed circuit including the battery modules BM(2) to BM(n) of the high voltage battery 22 are formed. In the above embodiment, the two closed circuits are switched to open circuits by performing a single operation on the single service plug 40. Thus, multiple operations do not need to be manually performed to switch the two closed circuits to open circuits.

In the above embodiment, if the entire plug main body 42 of the service plug 40 is conductive, the service plug 40 needs to be moved so that the plug main body 42 is located at neither the first disconnection portion D1 nor the second disconnection portion D2 to disconnect both the first disconnection portion D1 and the second disconnection portion D2. In this regard, in the above embodiment, the plug main body 42 of the service plug 40 has the insulation portion 42b between the first connection portion 42a and the second connection portion 42c. Thus, when the service plug 40 is moved so that the first connection portion 42a of the plug main body 42 is not arranged at the first disconnection portion D1 and so that the insulation portion 42b is located at the second disconnection portion D2, each closed circuit is switched to an open circuit, for example, without complete removal of the service plug 40 from the casing or the like.

The present embodiment may be modified as follows. The present embodiment and the following modified examples may be implemented in combination with each other in a range causing no technical contradiction.

In the above-described embodiment, the electronic control unit 30 centrally controlling the entire hybrid system executes the series of charging discharging control processes. However, for example, a control unit that controls the engine 10 and a control unit that performs the relay switching control of the vehicle power supply device may be different processing circuits (for example, computers).

The output voltage of the low voltage battery 24 may be appropriately changed as long as it is less than the output voltage of the high voltage battery 22. The output voltage of the low voltage battery 24 may be, for example, 24 V or 48 V.

The kind of the low voltage battery 24 is not limited to a lead storage battery. The kind of the high voltage battery 22 is not limited to a lithium ion battery as long as multiple battery modules BM are connected in series. For example, a nickel hydride battery, a NAS battery, or a solid-state battery may be used as the high voltage battery 22 and the low voltage battery 24. The low voltage power supply may be a capacitor having a certain level of charge capacity.

Instead of or in addition to the inverter 21, the vehicle power supply device may include another high voltage auxiliary device that receives electric power from the high voltage battery 22.

The DC/DC converter 23 may be omitted. In this case, the vehicle power supply device may include, for example, an alternator that supplies electric power to the low voltage battery 24 separately from the motor generator 20.

In the above embodiment, in the circuit configuration of the vehicle power supply device, the voltmeter 26 detects the voltage Vh of the high voltage circuit. Instead, another configuration that detects the voltage Vh of the high voltage circuit may be used. For example, since the resistance value in the entire circuit configuration of the vehicle power supply device can be estimated, the voltage Vh of the high voltage circuit may be estimated or detected by detecting the input current to the inverter 21. In this case the voltage detector includes an ammeter that detects the input current to the inverter 21.

For example, another relay may be added to the circuit configuration of the vehicle power supply device of the above embodiment. In the case of adding another relay, the closed circuit configuration shown in FIG. 4 and the closed circuit configuration shown in FIG. 6 may be switched in accordance with the presence and absence of the low voltage switching request.

In the circuit configuration of the vehicle power supply device of the above embodiment, the positive electrode terminal of the high voltage battery 22 may be connected to the second main relay MR2, and the negative electrode terminal of the high voltage battery 22 may be connected to the first main relay MR1 and the second switching relay SR2. In this case, the positive electrodes and the negative electrodes of the low voltage battery 24, the low voltage auxiliary device 25, the inverter 21, and the DC/DC converter 23 may also be switched. In this modified example, the negative electrode terminal of each member corresponds to the first electrode terminal, and the positive electrode terminal corresponds to the second electrode terminal.

The application of the relay switching control of the above embodiment is not limited to the vehicle power supply device of a hybrid vehicle. More specifically, the relay switching control of the above embodiment may be applied to a vehicle power supply device that includes a high voltage battery and a battery that has a lower voltage than the high voltage battery and is not limited to the configuration in which the high voltage battery 22 supplies electric power to the motor generator 20.

In the above embodiment, when the low voltage switching request is made, the switching module group connected to the low voltage battery 24 is formed by the single battery module BM(1). However, the switching module group may be formed by multiple battery modules BM. More specifically, the single switching module group may be formed by multiple consecutive battery modules BM. When the low voltage switching request is made, for example, the switching module group may include the battery module BM(1) and the battery module BM(2) and be connected to the low voltage battery 24. In other words, the connection destination of the first switching relay SR1 may be switched from the positive electrode terminal of the battery module BM(3) to the low voltage battery 24. In this case, the first switching relay SR1 may be connected to the negative electrode terminal of the battery module BM(2). Additionally, the third switching relay SR3 may be connected to the positive electrode terminal of the battery module BM(3). However, the output voltage of the switching module group may be set so as not to significantly deviate from the output voltage of the low voltage battery 24.

When the low voltage switching request is made, the switching module group connected to the low voltage battery 24 does not necessarily have to include the battery module BM(1). When the low voltage switching request is made, for example, the battery module BM(2) may be connected to the low voltage battery 24. In this case, the first switching relay SR1 is connected to the negative electrode terminal of the battery module BM(2), and the second switching relay SR2 is connected to the positive electrode terminal of the battery module BM(2). The third switching relay SR3 may be connected to the positive electrode terminal of the battery module BM(3).

In the above modified example, a relay may be provided to switch the electrical connection between the negative electrode terminal of the battery module BM(1) and the positive electrode terminal of the battery module BM(3). When the low voltage switching request is made, the relay may be switched to a closed state so that the battery module BM(1) and the battery module BM(3) are connected in series.

The condition for switching the low voltage switching request from the absence state to the presence state is not limited to those in the embodiment described above. In one example, when an abnormality occurs in the DC/DC converter 23, the low voltage switching request may be made regardless of other conditions. In another example, when the state of charge of the low voltage battery 24 is relatively low, the low voltage switching request may be switched from the absence state to the presence state regardless of whether or not an abnormality occurs in the DC/DC converter 23. Any conditions may be used as long as it can be determined that the state of charge of the low voltage battery 24 is excessively low or that the state of charge of the low voltage battery 24 is likely to be excessively low.

In the relay switching process of the above embodiment, the process (steps S13 and S23) of comparing the voltage Vh of the high voltage circuit with the specified voltage Vx and the related process (steps S14, S15, S24, and S25) may be omitted. In this case, the voltmeter 26 may be omitted.

In the relay switching process of the above embodiment, when it is determined that the low voltage switching request is switched from the absence state to the presence state, the series of relay switching process may be terminated. More specifically, steps S21 to S29 shown in FIG. 8 may be omitted. For example, when an abnormality occurs in the DC/DC converter 23, the DC/DC converter 23 is highly likely to have a fault. Thus, even when an abnormality has occurs in the DC/DC converter 23 and the abnormality is temporarily eliminated, the abnormality will probably occur again. In this regard, when an abnormality occurs in the DC/DC converter 23 and the low voltage switching request is switched from the absence state to the presence state, the battery module BM(1) may remain connected to the low voltage battery 24 regardless of whether or not the low voltage switching request is switched between the presence state and the absence state thereafter.

The entire plug main body 42 of the service plug 40 may be conductive. In this case, when the service plug 40 is moved until the plug main body 42 is no longer located at the first disconnection portion D1 and the second disconnection portion D2, the two closed circuits are both switched to open circuits.

The shape of the service plug 40 may be changed. For example, the distal end of the plug main body 42 of the service plug 40 is divided into two parts. The connection portion of one part is electrically connected to the first disconnection portion D1, and the connection portion of the other part is electrically connected to the second disconnection portion D2. Even in this case, both of the two closed circuits are switched to open circuits by performing a single operation on the single service plug 40.

The number of service plugs may be plural. More specifically, the service plug for electrically connecting the first disconnection portion D1 may be separate from the service plug for electrically connecting the second disconnection portion D2.

The service plug 40 may be omitted. For example, a switch that is manually operated to switch the second main relay MR2 and the second switching relay SR2 to an open state may be used in the service plug 40.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle power supply device, comprising:
   a high voltage battery including battery modules connected in series, the high voltage battery being configured to supply electric power to a high voltage auxiliary device, wherein each of the battery modules has a first electrode terminal and a second electrode terminal, one of a first electrode and a second electrode is a positive electrode, the other of the first electrode and the second electrode is a negative electrode, one or more of the battery modules form a switching module group, and one of the battery modules configured to be connected to the second electrode terminal of the switching module group is a first battery module;
   a low voltage power supply that has a lower voltage than the high voltage battery;
   a first main relay configured to switch an electrical connection between the first electrode terminal of the high voltage battery and a first electrode terminal of the high voltage auxiliary device;
   a second main relay configured to switch an electrical connection between the second electrode terminal of the high voltage battery and a second electrode terminal of the high voltage auxiliary device;
   a precharge circuit including a precharge relay configured to switch an electrical connection and a resistor connected in series to the precharge relay, wherein the precharge circuit is connected in parallel to the second main relay;
   a first switching relay configured to selectively connect the second electrode terminal of the switching module group to one of the first electrode terminal of the first battery module and a second electrode terminal of the low voltage power supply;
   a second switching relay configured to switch an electrical connection between the first electrode terminal of the switching module group and a first electrode terminal of the low voltage power supply;
   a third switching relay configured to switch an electrical connection between the first electrode terminal of the first battery module and the first electrode terminal of the high voltage auxiliary device; and
   a relay controller configured to control the first main relay, the second main relay, the precharge relay, the first switching relay, the second switching relay, and the third switching relay, wherein when a low voltage switching request is made to set a mode for supplying electric power from the switching module group to the low voltage power supply, the relay controller is configured to perform in sequence
   a first process of switching the first main relay and the second main relay to an open state,
   a second process of connecting the first switching relay to the second electrode terminal of the low voltage power supply and switching the second switching relay to a closed state,
   a third process of switching the precharge relay to a closed state and switching the third switching relay to a closed state,
   a fourth process of switching the second main relay to a closed state, and
   a fifth process of switching the precharge relay to an open state.

2. The vehicle power supply device according to claim 1, wherein when the low voltage switching request stops, the relay controller is configured to perform in sequence
   a sixth process of switching the third switching relay and the second main relay to an open state,
   a seventh process of connecting the first switching relay to the first electrode terminal of the first battery module and switching the second switching relay to an open state,
   an eighth process of switching the precharge relay to a closed state and switching the first main relay to a closed state,
   a ninth process of switching the second main relay to a closed state, and
   a tenth process of switching the precharge relay to an open state.

3. The vehicle power supply device according to claim 1, further comprising a voltage detector configured to detect a voltage between the first electrode terminal of the high voltage auxiliary device and the second electrode terminal of the high voltage auxiliary device, wherein
   the relay controller is configured to perform the second process when the voltage detected by the voltage detector is less than or equal to a specified voltage after the first process is performed, and
   the specified voltage is set to be less than an output voltage of the low voltage power supply.

4. The vehicle power supply device according to claim 1, wherein
   at least one of the battery modules located at a second electrode side of the switching module group forms a battery module group,
   the vehicle power supply device further comprising a service plug configured to be operated to switch a closed circuit including the battery module group and a closed circuit including the switching module group to an open circuit, and when the low voltage switching request is made, the service plug is configured to switch the closed circuit including the switching module group to an open circuit by the operation.

5. The vehicle power supply device according to claim 4, wherein
the service plug includes:
a first connection portion configured to electrically connect a first disconnection portion provided between adjacent ones of the battery modules in the battery module group;
a second connection portion configured to electrically connect a second disconnection portion provided between the first switching relay and the second electrode terminal of the low voltage power supply; and
an insulation portion having no conductivity, and
the service plug is configured to be operated so that the insulation portion is arranged at one of the first disconnection portion and the second disconnection portion and so that the service plug is not arranged at the other of the first disconnection portion and the second disconnection portion.

6. A method for controlling a vehicle power supply device, wherein the vehicle power supply device includes
a high voltage battery including battery modules connected in series, the high voltage battery being configured to supply electric power to a high voltage auxiliary device, wherein each of the battery modules has a first electrode terminal and a second electrode terminal, one of a first electrode and a second electrode is a positive electrode, the other of the first electrode and the second electrode is a negative electrode, one or more of the battery modules form a switching module group, and one of the battery modules configured to be connected to the second electrode terminal of the switching module group is a first battery module,
a low voltage power supply that has a lower voltage than the high voltage battery,
a first main relay configured to switch an electrical connection between the first electrode terminal of the high voltage battery and a first electrode terminal of the high voltage auxiliary device,
a second main relay configured to switch an electrical connection between the second electrode terminal of the high voltage battery and a second electrode terminal of the high voltage auxiliary device,
a precharge circuit including a precharge relay configured to switch an electrical connection and a resistor connected in series to the precharge relay, wherein the precharge circuit is connected in parallel to the second main relay,
a first switching relay configured to selectively connect the second electrode terminal of the switching module group to one of the first electrode terminal of the first battery module and a second electrode terminal of the low voltage power supply,
a second switching relay configured to switch an electrical connection between the first electrode terminal of the switching module group and a first electrode terminal of the low voltage power supply, and
a third switching relay configured to switch an electrical connection between the first electrode terminal of the first battery module and the first electrode terminal of the high voltage auxiliary device, wherein
the method comprises performing in sequence, when a low voltage switching request is made to set a mode for supplying electric power from the switching module group to the low voltage power supply:
a first process of switching the first main relay and the second main relay to an open state,
a second process of connecting the first switching relay to the second electrode terminal of the low voltage power supply and switching the second switching relay to a closed state,
a third process of switching the precharge relay to a closed state and switching the third switching relay to a closed state,
a fourth process of switching the second main relay to a closed state, and
a fifth process of switching the precharge relay to an open state.

* * * * *